Feb. 7, 1928.
G. M. LATHROP
1,658,408
CONVERTIBLE AUTOMOBILE SEAT
Filed June 28, 1927
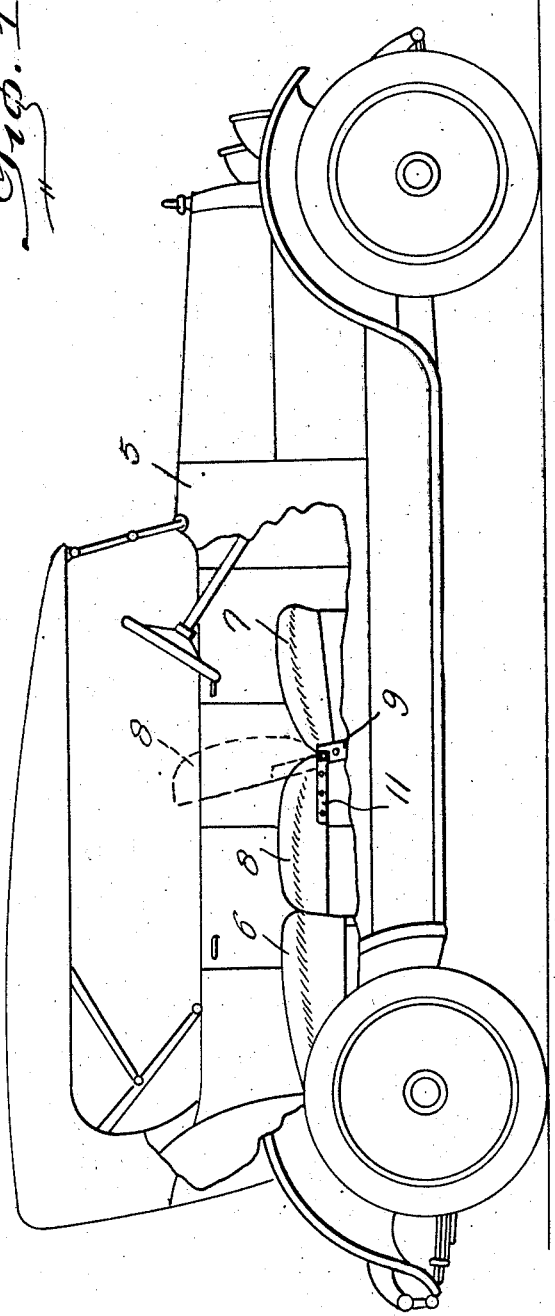
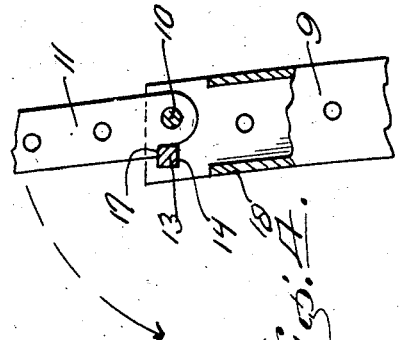
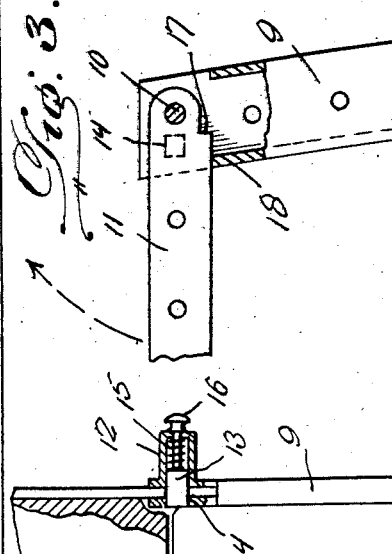
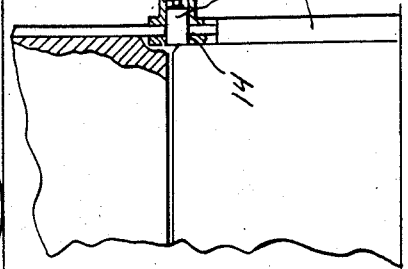
Inventor
*G. M. Lathrop*
By *Clarence A. O'Brien*
Attorney Patented Feb. 7, 1928.

1,658,408

UNITED STATES PATENT OFFICE.

GEORGE M. LATHROP, OF NEBRASKA CITY, NEBRASKA.

CONVERTIBLE AUTOMOBILE SEAT.

Application filed June 28, 1927. Serial No. 202,054.

My invention relates to automobile seats and has for its principal object to provide means for converting the seat into a bed. With this object in view I provide an automobile having a front and rear seat, the back rest of the front seat being hingedly connected along its lower edge whereby to permit the same to be moved from its normal vertical position into a horizontal position so as to form an unbroken horizontal surface between the front and rear seats, thereby forming the same into a bed.

A further object is to provide a hinged connection at each lower side of the back rest of the front seat, a pin being arranged to engage the movable part of the hinged connection whereby to releasably lock the seat in normal position and adapted to be released from engagement therewith so as to permit the back rest of the seat to be swung downwardly in a horizontal position.

A still further object is to provide a device of this character adapted for use upon automobiles of either the open or closed type, which may be installed without affecting any material change in the design or construction of the seats of the car in which the parts required for hingedly mounting the back rest are reduced to a minimum, which provides for the conversion of the seats of the car into a comfortable bed in a simple and easy manner, and which is relatively inexpensive to install.

Other objects and advantages of the invention will become apparent as the nature of the invention is better understood from the following description when taken in conjunction with the accompanying drawing.

In the accompanying drawing forming part of this application and in which like numerals indicate corresponding parts:

Figure 1 is a side elevational view of an automobile with parts broken away showing the interior seat arrangement both in normal and converted form.

Figure 2 is a transverse vertical sectional view of the pivoted arm at one side of the front seat forming the hinged connection therefor and illustrating the operating means for the locking pin.

Figure 3 is a fragmentary detail of the pivoted arm for the front seat showing the same in converted position, and Figure 4 is a similar view showing the arm locked in normal position.

In the present embodiment of the invention I have disclosed the same adapted for use in connection with an automobile indicated at 5 of the open type, it being understood however that the invention may be used with equal facility upon other types of machines. Within the automobile is arranged a rear seat 6 and front seat 7 which may be permanently secured within the car or removably mounted as desired, said seat being spaced apart an equal distance to the height of the back rest 8 of the front seat for the purpose hereinafter explained.

The back rest 8 is hingedly mounted so as to permit the same to be moved from its normal substantially vertical position into a horizontal position to fit between the adjacent edges of the seat as illustrated in Figure 1 of the drawing, such hinged connection comprising fixedly mounted posts 9 secured to the body of the car at the lower edge of each side of the back rest and provided with pivot pins 10 near the upper edge thereof constituting means for pivotally mounting the lower ends of arms 11 secured to the opposite sides of the back rest.

A laterally extending housing 12 is formed on the upper end of the support 9 within which is slidably arranged a pin 13 adapted to be inserted in an opening 14 arranged in the support, said pin being normally retained inwardly within the opening by means of a coil spring 15 disposed within the housing, one end of the pin extending outwardly therefrom and provided with a handle 16 for the purpose of removing the pin from the opening when so desired.

The pin 13 and pivot pin 10 are arranged at a substantially horizontal plane as shown in Figures 3 and 4 of the drawing, said pin being spaced sufficiently apart from the pivot pin 10 whereby to engage the rear edge of the pivotally mounted arm 11. At the point of engagement of the pin 13 with said arm the latter is provided with a shoulder 17 adapted to rest upon the pin whereby to normally support the arm and the back rest in a substantially vertical position. Upon removal of the pin 13 the arm is thereby permitted to swing downwardly until the rear edge thereof engages the upper edge of a flange 18 formed on the support 9 as shown in Figure 3. In this manner the back rest 8 is adapted to be supported in a horizontal position between the front and rear seat, thus permitting the same to be converted into a bed.

It is apparent that the operation necessary to convert the seats into a bed is extremely simple and easily and quickly accomplished.

It is obvious that I have shown the preferred embodiment of my invention, but it is to be understood that various changes in the size, shape and arrangement of parts may be resorted to without departing from the spirit of the invention and the scope of the appended claim.

Having thus described the invention, what I claim as new and desire to secure by Letters Patent is:—

In a convertible seat for automobiles comprising a back rest pivotally mounted at the rear edge of the seat and adapted to be moved downwardly along a horizontal plane with said seat, said pivotal connection comprising a pair of permanently attached posts secured beneath the back rest at opposite sides thereof, and having pivot pins formed at the upper edges thereof with an opening adjacent said pins, a housing extending laterally from each of said posts adjacent the openings therein, a pin slidably carried in the housing with one end extending outwardly therefrom and provided with an operating handle, a spring arranged within the housing normally engaging the pin with the opening, an arm secured to each side of the back rest having the lower ends thereof pivotally mounted on the pivot pins of the adjacent support, a shoulder formed on the rear edge of said arm engageable with said pins whereby to support the back rest in normal position, and a flange formed on said support engageable with the rear edge of said arm whereby to support the back rest in horizontal position.

In testimony whereof I affix my signature.

GEORGE M. LATHROP.